(12) United States Patent
Koshy

(10) Patent No.: US 8,455,783 B2
(45) Date of Patent: Jun. 4, 2013

(54) ELECTRO-EROSION EDGE HONING OF CUTTING TOOLS

(75) Inventor: Philip Koshy, Hamilton (CA)

(73) Assignee: McMaster University, Hamilton, Ontario (CA)

( * ) Notice: Subject to any disclaimer, the term of this patent is extended or adjusted under 35 U.S.C. 154(b) by 776 days.

(21) Appl. No.: 12/548,858

(22) Filed: Aug. 27, 2009

(65) Prior Publication Data

US 2011/0049108 A1    Mar. 3, 2011

(51) Int. Cl.
*B23H 9/08* (2006.01)

(52) U.S. Cl.
USPC ........ 219/69.17; 205/652; 205/654; 205/661; 205/668; 205/664

(58) Field of Classification Search
None
See application file for complete search history.

(56) References Cited

U.S. PATENT DOCUMENTS

| | | | | |
|---|---|---|---|---|
| 3,553,415 A | * | 1/1971 | Girard | 219/69.14 |
| 4,387,287 A | * | 6/1983 | Marazzi | 219/69.17 |
| 4,641,007 A | * | 2/1987 | Lach | 219/69.17 |
| 4,992,639 A | * | 2/1991 | Watkins et al. | 219/69.2 |
| 5,178,645 A | | 1/1993 | Nakamura et al. | |
| 5,648,122 A | * | 7/1997 | Rao et al. | 427/444 |
| 5,697,994 A | * | 12/1997 | Packer et al. | 51/309 |
| 5,709,587 A | | 1/1998 | Shaffer | |
| 5,804,789 A | * | 9/1998 | Saito et al. | 219/69.17 |
| 6,139,656 A | | 10/2000 | Wilkosz et al. | |
| 6,287,177 B1 | | 9/2001 | Shaffer | |
| 7,063,594 B1 | | 6/2006 | Engin et al. | |
| 7,982,158 B2 | * | 7/2011 | Koishikura et al. | 219/69.17 |
| 2005/0273999 A1 | * | 12/2005 | Shei et al. | 29/603.16 |
| 2008/0118313 A1 | * | 5/2008 | Jonsson et al. | 407/42 |
| 2009/0127231 A1 | * | 5/2009 | Sung et al. | 219/69.16 |

OTHER PUBLICATIONS

Figures 5 and 6 from U.S. Appl. No. 12/267,124, PGPUB 20090127231.*

Raichenko, et al., "Operating Characteristics of Diamond Honing Slips Produced by the Electric-Discharge Sintering Method," Institute of Materials Science, Academy of Sciences of the Ukrainian SSR. Translated from Poroshkovaya Metallurgiya, No. 8(176), pp. 92-94, Aug. 1977 (2 pages).

* cited by examiner

*Primary Examiner* — David E Graybill
(74) *Attorney, Agent, or Firm* — McCarter & English, LLP

(57) ABSTRACT

A process for preparing the cutting edge of a cutting tool having a rake face and a clearance face. The process comprises the elimination of material from the cutting edge by providing a series of rapidly recurring electrical spark discharges in a gap located between the tool edge and a counterface. The spark discharges vaporize and melt the tool edge to form a desired radius.

18 Claims, 5 Drawing Sheets

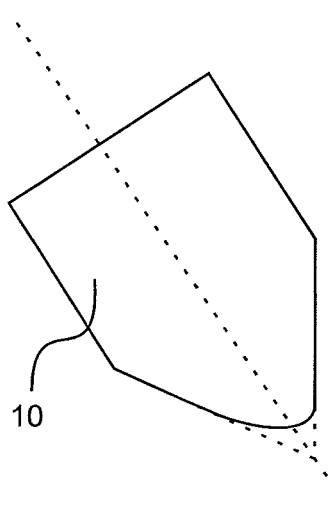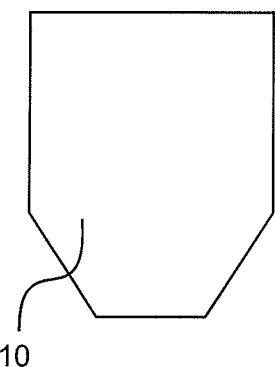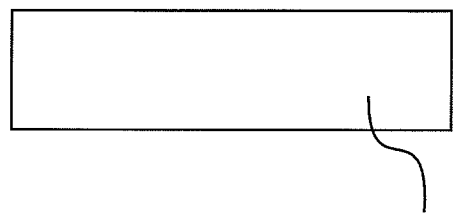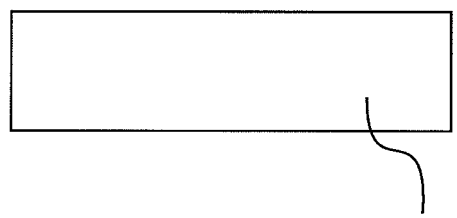
Fig. 4a                    Fig. 4b

ELECTRO-EROSION EDGE HONING OF CUTTING TOOLS

FIELD OF THE INVENTION

The invention relates to a process for honing the edge of a cutting tool using a series of controlled and rapid spark discharges.

BACKGROUND

Industrial tools for cutting and shaping materials are fabricated from hard materials in order to maintain their edges and to withstand the concentrated stresses that are present at the cutting edge. These tools are frequently fabricated from materials including high speed steel (HSS), cemented carbide, ceramic, polycrystalline diamond (PCD), polycrystalline cubic boron nitride (PCBN) or similar ultra-hard materials.

Investigations have found that imparting a small radius on the cutting edge of an industrial tool on the order of several micrometers has various advantages. A tool with an edge appropriately prepared is typically less susceptible to catastrophic chipping during machining, which leads to a many-fold improvement in tool life. In addition, edge preparation improves the overall surface quality of the machined parts. The process of imparting a very small radius on the cutting edge of a cutting tool is known as edge honing. Due to the aforementioned advantages, edge honing has become a critical element in the manufacture and performance of industrial cutting tools.

A variety of different devices and methods have been developed to hone the edges of cutting tools. U.S. Pat. No. 5,178,645 to Nakamura, et al. discloses a method for honing the edge of a PCD cutting tool by applying a YAG laser to the cutting edge of the tool. The tool is inclined with respect to the laser beam and moved to hone the cutting edge. Alternatively, the laser beam is adjusted while the tool is in a fixed position. The laser beam processing parameters are pre-selected such that a radius forms along the exposed portion of the cutting edge.

The method of U.S. Pat. No. 5,709,587 to Shaffer consists of directing a pressurized fluid stream that is comprised of an abrasive grit entrained in a fluid. The fluid stream is directed against the sharp cutting edge of an elongated rotary tool for a pre-selected time to transform the sharp cutting edge into a relatively honed edge.

The apparatus of U.S. Pat. No. 6,287,177 to Shaffer comprises a base with a rotating brush with abrasive bristles mounted to a variable speed motor. A mount with a fixture for holding the cutting tool is attached to the base. The mount has a translational mechanism for controlling the position of the edge of the cutting tool relative to the rotating brush. The edge of the cutting tool is honed by controlling the movement and position of the cutting tool through the volume of the abrasive bristles, which results in the formation of a tapered edge.

The method of U.S. Pat. No. 7,063,594 to Engin, et al. consists of immersing the cutting edges of a cutting tool in an abrasive liquid bath. The bath contains an abrasive granular media, which is circulated through the bath such that the cutting edges are disposed within the flow path of the abrasive media. Alternatively, the cutting edges of a cutting tool are immersed in an abrasive liquid bath and the cutting tool is rotated. The abrasive media is comprised of very small abrasive granules such that a radius along the full length of the cutting edges forms after prolonged exposure.

It is very difficult with the foregoing approaches to achieve a consistent and repeatable radius along the full length of the cutting edge. Variation in the edge radius affects cutting performance in terms of efficient chip formation, which has adverse implications in terms of tool life and the quality of the machined surface.

In addition to problems with generating consistent hone radii, these methods are also expensive, and are limited when applied to ultra-hard tool materials like such as PCD or PCBN, on account of their extreme hardness. The demand for such tools is on the rise, and hence the need for better honing methods.

Accordingly, an improved process for honing the edges of cutting tools with consistent and repeatable results is highly desired.

SUMMARY OF THE INVENTION

The present invention is a process of preparing the cutting edge of a cutting tool having a rake face and a clearance face, with a cutting edge at least partially disposed therebetween. The process comprises the melting and vaporization of material from the cutting edge by providing a series of rapidly recurring electrical spark discharges in a gap located between the tool edge and a counterface. The spark discharges vaporize and melt the tool edge to form the desired radius.

In some embodiments, the gap can range from approximately 2 μm to approximately 100 μm.

The spark discharges form a radius on the cutting edge from 2 μm to a pre-determined threshold which includes a radius of infinity that corresponds to a plane surface, known as a chamfer.

In some embodiments, the process comprises flushing of the discharge gap by a gaseous or liquid dielectric fluid. The fluid may contain abrasive or metallic particle additives.

In some embodiments, the removal of discharge material is enhanced by the use of an electrolyte or a dielectric.

In some embodiments, the cutting tool is positioned in various orientations relative the tool axis for symmetric or asymmetric edge preparation.

In some embodiments, including when preparing the edges of a complex tool, the tool is moved relative to a fixed counterface in two or more dimensions. In other embodiments, the counterface is moved relative to the fixed tool in two or more dimensions. In still other embodiments, both the tool and counterface are moved relative each other in two or more dimensions.

The counterface is a metallic or electrically conducting material such as aluminium or graphite.

BRIEF DESCRIPTION OF THE FIGURES

FIG. 4a shows a side view of a cutting tool obliquely orientated relative to a counterface with an asymmetric radius formed on the cutting edge.

FIG. 4b shows a side view of a cutting tool with a flat chamfer edge formed on the cutting edge.

DETAILED DESCRIPTION OF THE INVENTION

The present invention is now described with reference to the drawings. In the following description, for purposes of explanation, numerous specific details are set forth in order to provide a thorough understanding of the present invention. It may be evident, however that the present invention may be practiced without these specific details.

Figure 1:
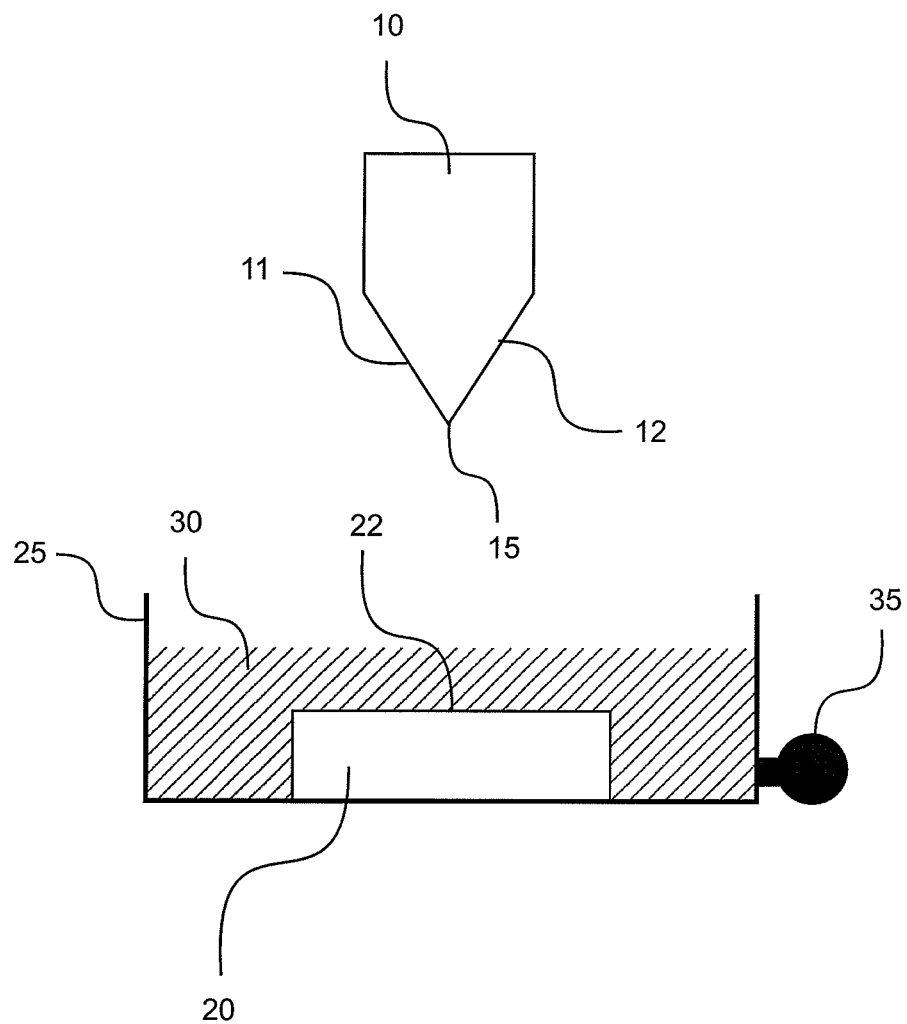
FIG. 1 depicts a side view of a cutting tool disposed a predetermined distance from a counterface which is submerged in a tank containing a dielectric fluid.

Referring now to FIG. 1, a cutting tool 10 is disposed a predetermined distance from a counterface 20. Cutting tool 10 has a rake face 11, clearance face 12 and edge portion 15, and is fabricated from an electrically conductive material. Counterface 20 is comprised of a pre-selected electrically conductive material such as copper, aluminium, graphite or steel and has a relatively flat, planar surface 22. Counterface 20 is submerged in a tank 25 containing a dielectric fluid 30. Dielectric fluid 30 is re-circulated through a filter 35 attached to tank 25.

Figure 2:
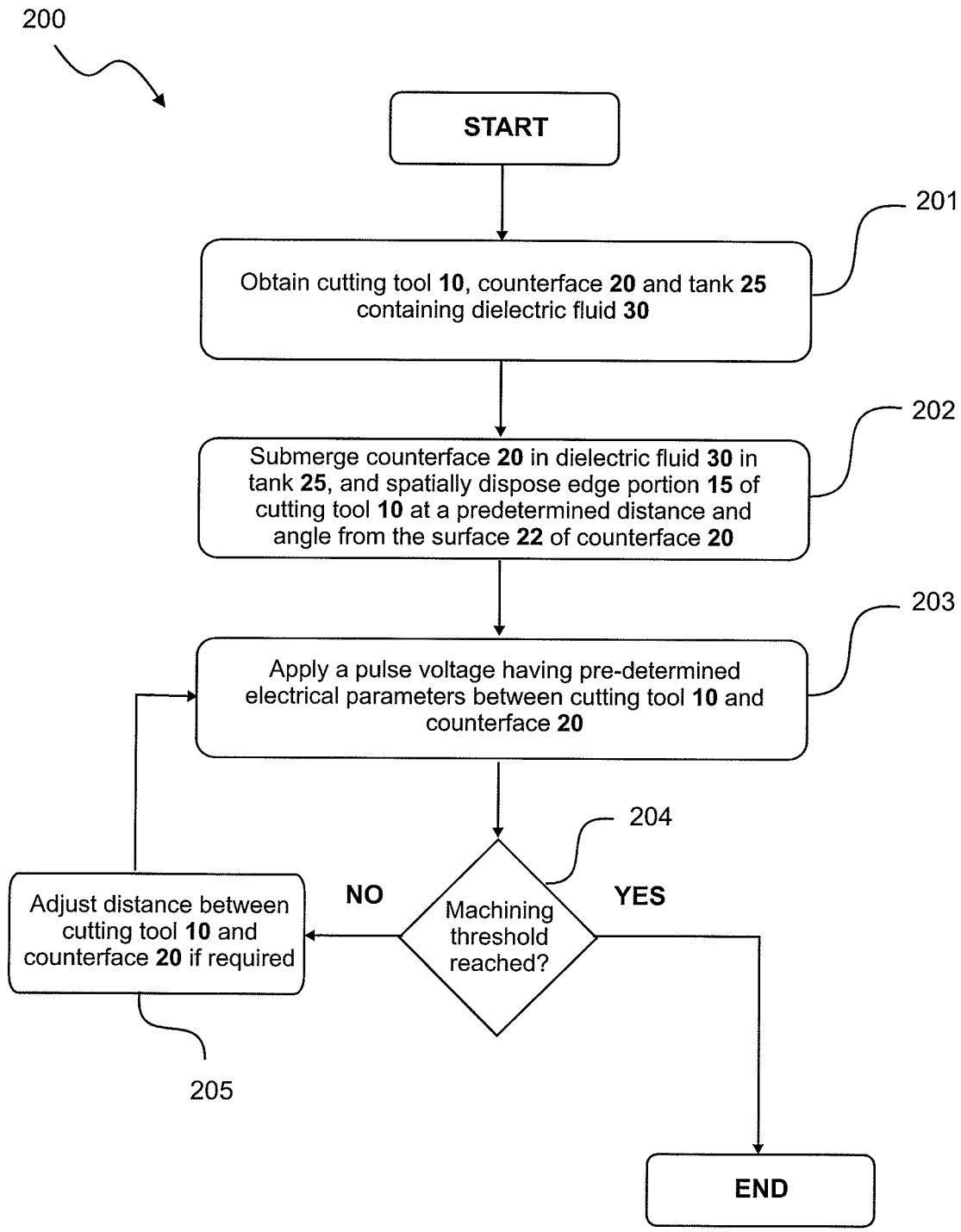
FIG. 2 is a flow diagram illustrating a process for honing the edge of a cutting tool according to the present invention.

Referring now to FIG. 2, a flow diagram 200 of a process for honing the edges of a cutting tool using controlled and rapid spark discharges is shown in accordance with the present invention. At 201, cutting tool 10 and counterface 20 are provided. Counterface 20 is submerged in tank 25 containing dielectric fluid 30, and edge portion 15 is spatially disposed at a predetermined distance and angle from surface 22 of counterface 20 at 202. Typically, the distance between edge portion 15 and surface 22 can range from approximately 2 μm to approximately 100 μm.

Figure 3A:
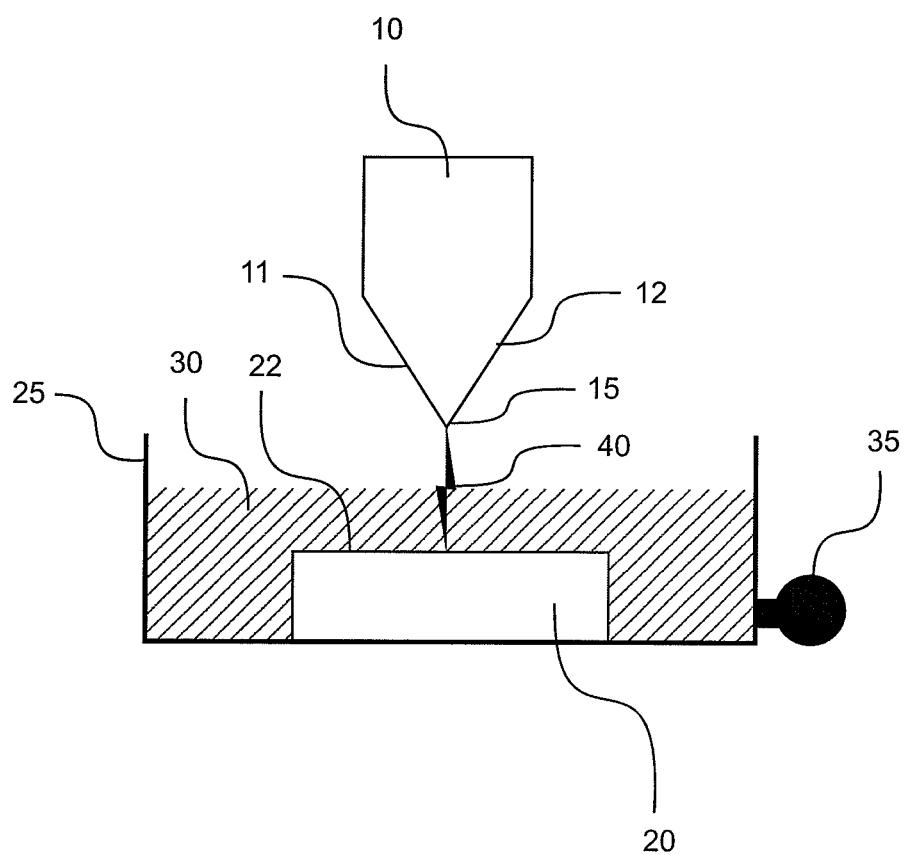
FIG. 3a shows the cutting tool and counterface of FIG. 1 and a spark that occurred following the application of a pulse voltage applied between the cutting tool and the counterface.
Figure 3B:
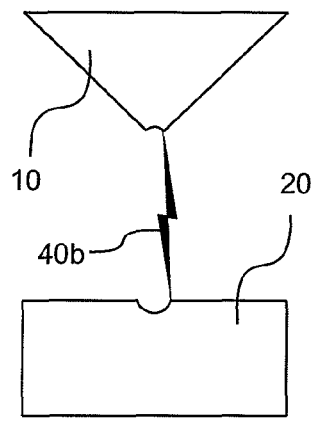
FIG. 3b shows the cutting tool and counterface of FIG. 3a with material removed due to the heating associated with the spark.
Figure 3C:
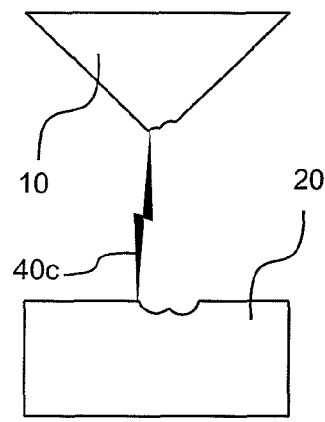
FIGS. 3c to 3g shows the cutting tool and counterface of FIG. 3a with additional material removed due to the heating associated with additional sparks.
Figure 3D:
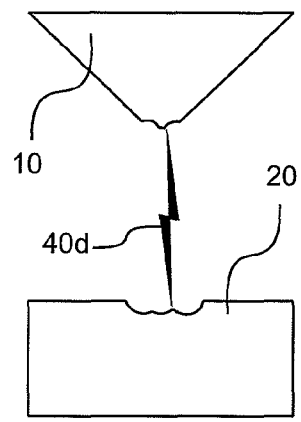
Figure 3E:
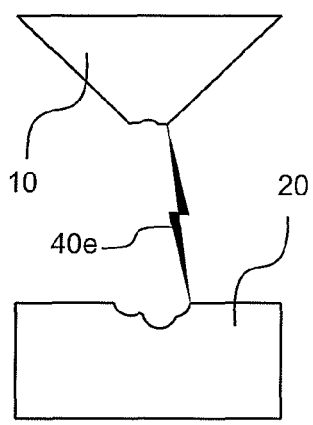
Figure 3F:
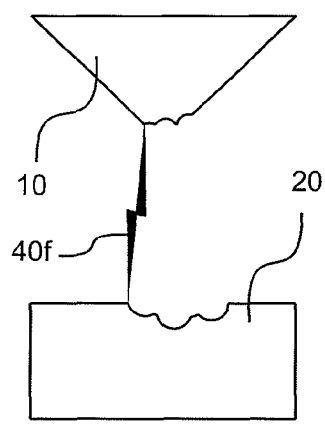
Figure 3G:
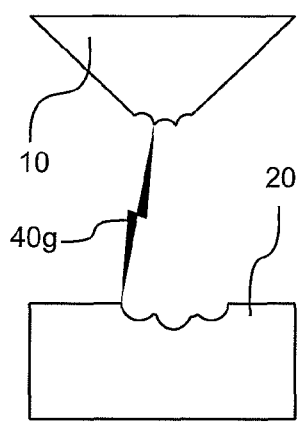

At 203, a pulse voltage having pre-determined electrical parameters is applied between cutting tool 10 and counterface 20, which function as the electrodes. After the electrical resistance of dielectric fluid 30 has been overwhelmed, a spark 40 occurs at the closest point between edge portion 15 and counterface 20, as shown in FIG. 3a. The temperature of the plasma channel associated with spark 40 results in the removal of material from both edge portion 15 and counterface 20 as shown in FIG. 3b. The resulting particles formed from the removed material are flushed away by dielectric fluid 30 and are filtered from dielectric fluid 30 by filter 35. A person of skill in the art will appreciate that a gaseous dielectric may substituted for dielectric fluid 30.

Additional pulse voltages are applied between cutting tool 10 and counterface 20 until a pre-determined threshold of machining time has been reached at 204. As material is continually removed, the gap between the tool and the counterface increases and, if a consistent gap is required in order to achieve the desired results, the cutting tool 10 may be fed towards the counterface 20 to compensate for the increase in gap or vice versa at 205. Alternatively, both cutting tool 10 and counterface 20 are moved simultaneously.

Since first electrical discharge or spark 40 will take the path of least electrical resistance between edge portion 15 and counterface 20, the heat associated with each successive spark, 40b, 40c, 40d, 40e, 40f, 40g will melt and/or vaporize and remove a small amount of material from each of cutting tool 10 and counterface 20 as shown in FIGS. 3b to 3g. After a pre-determined number of pulse voltages have been applied between cutting tool 10 and counterface 20, a uniform radius will form along the entire length of edge portion 15. Optionally, material removal may be aided electrolytically by the use of an electrolyte (not shown).

In some embodiments, cutting tool 10 is oriented perpendicularly to counterface 20 to form a symmetric uniform radius. Optionally, cutting tool 10 is obliquely orientated relative to counterface 20 to form an asymmetric radius such that more material may be removed from either the rake face 11 or clearance face, as shown in FIG. 4a.

The process may also be applied to complex tools by moving the tool relative to the counterface in two or more dimensions.

The formation of a uniform radius along the entire length of edge portion 15 is influenced by the ratio of the amount of material removed from edge portion 15 and counterface 20. The ratio of material removed, known as the wear ratio, is affected by several parameters, including but not limited to the choice of polarity, the electrical parameters, the spatial position of edge portion 15 relative to counterface 20, and the choice of materials for the cutting tool 10 and counterface 20.

If the wear ratio is set too low, edge portion 15 will machine directly into counterface 20 with minimal material removal from edge portion 15. If the wear ratio is too high, a flat chamfer edge will form on edge portion 15, and minimal material will be removed from counterface 20, as shown in FIG. 4b. In some embodiments, a chamfer edge is desirable. Where the desired radius of the cutting edge is extremely high a chamfer edge will form.

Several experiments were conducted using a die-sink electro-discharge machine to determine the influence of the various parameters on the wear ratio. Other apparatus which employ the process of the present invention are contemplated. The results of these experiments are summarized below.

Experiment I

Experiment I was conducted using a copper counterface, a HSS AISI T15 cutting insert, a voltage of 180 V, current of 2.4 A, and an on-time and off-time of 3.7 μs for 60 seconds. Copper was chosen as the counterface material since it is a common electrode material, and copper electrodes experience minimal wear when the electrode polarity is set to negative.

It was observed in Experiment I that when the polarity of the copper counterface was set to negative, this resulted in the formation of a flat or chamfer edge on the cutting insert, as opposed to a radius.

When the polarity of the copper counterface was set to positive, a significant amount of material was removed from the copper counterface and considerably less material was removed from the cutting insert. A proper radius did not form on the cutting insert as a result. Based upon the observed results, the wear ratio for a copper counterface and a HSS cutting insert was not within the desired range for forming an ideal radius on the cutting insert.

Experiment II

Experiment II was conducted using a steel counterface, a HSS AISI T15 cutting insert, a voltage of 180 V, current of 2.4 A, and an on-time and off-time of 3.7 μs for 60 seconds. Steel was chosen as the counterface material since the material removal rate is higher when set to positive polarity.

It was observed in Experiment II that when the polarity of the steel counterface was set to negative, this resulted in the formation of a flat edge on the cutting insert, although the flattening was less severe compared to Experiment I. Based upon the observed results, the wear ratio for a steel counterface and a HSS cutting insert was not within the desired range for forming an ideal radius on the cutting insert.

Experiment III

Experiment III was conducted using an aluminium counterface, a HSS AISI T15 cutting insert, a voltage of 180 V, current of 2.4 A, and an on-time and off-time of 3.7 μs for 60 seconds.

It was observed in Experiment III that an ideal radius formed on the cutting insert which increased linearly with increased machining time. Although the wear ratio was found to be in the ideal range, the surface finish on the edge of the cutting insert was rough.

Experiment IV

Experiment IV was conducted using an aluminium counterface, carbide and HSS cutting inserts were machined using identical EDM machine parameters of 100 V, current of 1.8 A, and an on-time and off-time of 0.6 μs.

It was observed that the amount of material removed per spark is highly influenced by the spark energy. As such, a larger radius was generated in the same period of machining time by increasing the energy. In addition, the cutting edge radius developed faster on the carbide cutting insert compared to the HSS cutting insert. It was also observed that when the discharge current was increased, the rate of the cutting edge radius formation did not increase linearly with the increasing current.

Unlike the result of Experiment III, the surface finish on the edge of the cutting insert was considerably smoother, and the finish on the carbide cutting insert was smoother than the finish on the HSS insert.

Experiment V

Experiment V was conducted to determine the reproducibility of the present invention. Six cutting inserts fabricated from HSS and carbide were machined using the parameters from Experiment IV, for a machining time of 80 seconds. From the results of Experiment V the radius along the cutting edge of the HSS cutting inserts varied by a maximum of 2.2 μm and the highest standard deviation was 1.5 μm. The variability along the cutting edge of the carbide cutting inserts was larger compared to the HSS results, however the mean radius was 50.2 μm as opposed to 50.0 μm for the HSS inserts.

Based upon the results of Experiment V, The maximum deviation along the edge of a prepared HSS insert was 3.8% of the desired radius compared to 35% for commonly used methods such as abrasive brush edge honing methods.

The reproducibility of the process according to the present invention is superior to the prior art processes for honing the edge of cutting tools. The present invention is readily adaptable for honing cutting tools fabricated from ultra-hard materials, since most PCD and PCBN cutting inserts are fabricated with a metallic binder, typically cobalt. A worker skilled in the art will appreciate that the process parameters include selecting the material for counterface 20, the spatial parameters of edge portion 15 relative to counterface 20, the electrical parameters and the threshold of machining time.

Although the foregoing experiments were conducted using a die-sink electro-discharge machine, a person of skill in the art will appreciate that the present invention is readily adapted for other similar machines, including electrochemical discharge machines.

Given that edge honing typically improves the life expectancy of cutting tools several fold, the economic advantages associated with the present invention are significant, and will greatly benefit the tool manufacturing industry.

Although the description above contains many specific details, these should not be construed as limiting the scope of the embodiments but as merely providing illustrations of some of the presently preferred embodiments. Thus the scope of the embodiments should be determined by the appended claims and their legal equivalents, rather than by the examples given.

What is claimed:

1. A process of preparing a cutting edge having a honed edge on a cutting tool; said tool comprising a rake face, and a clearance face with said cutting edge at least partially disposed therebetween, the process comprising:
    a. arranging said cutting edge to be spaced apart by a gap from a counterface, said counterface having a flat, planar surface;
    b. providing a plurality of recurring electrical discharges in said gap, said discharges resulting in the elimination of material from said cutting edge and said counterface surface;
    c. removing said material from said cutting edge and said counterface; and
    d. forming said honed edge on said cutting edge,
    wherein the counterface surface geometry changes after the providing step.

2. The process of claim 1, wherein said gap ranges from approximately 2 μm to approximately 100 μm wide.

3. The process of claim 2, wherein said tool is fed towards said counterface or vice versa to maintain said gap range.

4. The process of claim 1, wherein said formed edge has a radius ranging from 2 μm to a pre-determined threshold.

5. The process of claim 1, wherein said removing step further comprises flushing said material with a gaseous or liquid dielectric fluid.

6. The process of claim 1, wherein said electrical discharges are provided in a bath of dielectric fluid comprising abrasive or metallic particle additives.

7. The process of claim 1, wherein said material removal is enhanced by an electrolyte.

8. The process of claim 1, wherein said tool has an axis that is oriented perpendicular to said counterface for symmetric edge preparation.

9. The process of claim 1, wherein said cutting tool is obliquely oriented relative to said counterface for asymmetric edge preparation.

10. The process of claim 1, wherein said providing step further includes moving said cutting tool relative to said counterface in two or more dimensions.

11. The process of claim 1, wherein said providing step further includes moving said counterface relative to said cutting tool in two or more dimensions.

12. The process of claim 1, wherein said counterface is a metallic or electrical conducting material.

13. The process of claim 12, wherein said counterface is selected from the group consisting of aluminium, copper, and steel.

14. The process of claim 1, further comprising measuring the amount of material eliminated from said cutting edge and said counterface surface to calculate a wear ratio after the removing step.

15. A process for honing a cutting edge of a tool comprising an ultra-hard material, the process comprising:
    a. arranging said tool disposed relative to a counterface, said counterface having a flat, planar surface;

b. providing a plurality of electrical discharges between the length of the cutting edge and the counterface surface;

c. eliminating and removing material from both the cutting edge and the counterface surface by melting or vaporization; and d. honing an edge along the length of the cutting edge, wherein the counterface surface geometry changes after the providing step.

16. The process of claim 15, wherein said ultra-hard material is selected from the group consisting of high speed steel, carbide, polycrystalline diamond, and polycrystalline cubic boron nitride.

17. The process of claim 15 wherein steps b and c are repeated until said edge is honed to a desired edge radius.

18. A process for honing the cutting edge of a tool in an electro-discharge machine, said cutting edge having a length, by eliminating material from the cutting edge length and a planar electrode disposed relative to the cutting edge length with a plurality of controlled, electrical discharges provided therebetween, removing and measuring the eliminated material, and determining the radius formed along at least part of the cutting edge length.

\* \* \* \* \*